(12) United States Patent
Lim (10) Patent No.: US 12,073,576 B2
(45) Date of Patent: Aug. 27, 2024

(54) APPARATUS AND METHOD FOR GENERATING DEPTH MAP FROM MULTI-VIEW IMAGE

(71) Applicant: ELECTRONICS AND TELECOMMUNICATIONS RESEARCH INSTITUTE, Daejeon (KR)

(72) Inventor: Han-Shin Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 340 days.

(21) Appl. No.: 17/675,415

(22) Filed: Feb. 18, 2022

(65) Prior Publication Data
US 2022/0270276 A1  Aug. 25, 2022

(30) Foreign Application Priority Data

Feb. 22, 2021 (KR) ........................ 10-2021-0023148

(51) Int. Cl.
*G06T 7/55* (2017.01)
*G06T 7/593* (2017.01)
(Continued)

(52) U.S. Cl.
CPC ............... *G06T 7/55* (2017.01); *G06T 7/593* (2017.01); *G06T 17/20* (2013.01); *H04N 13/128* (2018.05); *H04N 13/271* (2018.05); *G06T 5/00* (2013.01)

(58) Field of Classification Search
CPC .. G06T 5/00; G06T 7/55; G06T 7/593; G06T 17/20; H04N 13/128; H04N 13/271; H04N 2013/008
See application file for complete search history.

(56) References Cited

U.S. PATENT DOCUMENTS 9,471,963 B2  10/2016  Kang et al.
10,818,026 B2 * 10/2020  Jain ........................ G06T 5/30
(Continued)

FOREIGN PATENT DOCUMENTS

KR  10-1526866  6/2015
KR  10-2017-0020210  2/2017
(Continued)

OTHER PUBLICATIONS

Zhaoxin Li et al: "Confidence-Based Large-Scale Dense Multi-View Stereo", IEEE Transactions on Image Processing, vol. 29, Jun. 9, 2020.
(Continued)

*Primary Examiner* — Daniel G Mariam
(74) *Attorney, Agent, or Firm* — KILE PARK REED & HOUTTEMAN PLLC (57) ABSTRACT

Disclosed herein is a method for generating a depth map from multi-view images, the method including receiving multi-view images and parameters thereof; generating an initial depth map, an initial normal map, and an initial reliability map for the multi-view images; performing selection of multiple initial vertices and triangulation based on the initial depth map and the initial normal map and generating depth values and normal values for the result of triangulation; performing regularization based on triangulation, selecting additional vertices in the initial depth map, and generating additional depth values and additional normal values based on the additional vertices and regularization; and refining the initial depth map into a refined depth map by replacing depth values and normal values having reliability below a preset level in the initial depth map and the initial normal map with the additional depth values and the additional normal values.

16 Claims, 8 Drawing Sheets

(51) Int. Cl.
  *G06T 17/20* (2006.01)
  *H04N 13/128* (2018.01)
  *H04N 13/271* (2018.01)
  *G06T 5/00* (2006.01)

(56) References Cited

U.S. PATENT DOCUMENTS

| | | |
|---|---|---|
| 11,164,326 B2 | 11/2021 | Liu et al. |
| 2013/0089259 A1 | 4/2013 | Cha et al. |
| 2017/0046868 A1 | 2/2017 | Chernov et al. |
| 2017/0272724 A1 | 9/2017 | Lim |
| 2018/0234669 A1* | 8/2018 | Chen .................. H04N 13/373 |
| 2019/0155302 A1 | 5/2019 | Lukierski et al. |
| 2020/0258247 A1 | 8/2020 | Lasserre et al. |

FOREIGN PATENT DOCUMENTS

| | | |
|---|---|---|
| KR | 10-2019-0032532 | 3/2019 |
| KR | 10-2020-0071565 | 6/2020 |
| KR | 10-2020-0075727 | 6/2020 |
| KR | 10-2021-0136259 | 11/2021 |

OTHER PUBLICATIONS

Li, Changjian, et al. "Robust flow-guided neural prediction for sketch-based freeform surface modeling." ACM Transactions on Graphics, Dec. 4, 2018.

Rumpler, Markus et al. "Multi-view stereo: Redundancy benefits for 3D reconstruction." 35th Workshop of the Austrian Association for Pattern Recognition. Jan. 2011.

* cited by examiner

APPARATUS AND METHOD FOR GENERATING DEPTH MAP FROM MULTI-VIEW IMAGE

CROSS REFERENCE TO RELATED APPLICATION

This application claims the benefit of Korean Patent Application No. 10-2021-0023148, filed Feb. 22, 2021, which is hereby incorporated by reference in its entirety into this application.

BACKGROUND OF THE INVENTION

1. Technical Field

The present invention relates generally to technology for generating a depth map from multi-view images, and more particularly to technology for generating a depth map from multi-view images, through which a high-quality depth map is capable of being generated by improving the accuracy of estimation of depth values.

2. Description of the Related Art

Due to recent global events, VR/AR content and devices and technologies related thereto are attracting more interest than before. In order to produce VR/AR content, a high-quality 3D model is essential. Technology for generating a 3D model from multi-view images has received a lot of attention as technology enabling efficient generation of a 3D model, and the extent of application thereof has expanded recently.

Technology for reconstructing and modeling an original scene or the accurate 3D structure of an object from multi-view images acquired by capturing a single scene or object from different viewpoints generally includes processes of extracting and matching feature points, estimating camera parameters pertaining to images, generating a dense point cloud, and reconstructing a 3D surface. Among these processes, generating a dense point cloud is aimed at accurately representing a scene and the structures of objects in multi-view images in the form of a 3D point cloud using camera parameters, acquired using the multi-view images and a structure-from-motion method, as input. The core process in the process of generating a dense point cloud from multi-view images is the process of acquiring a high-quality depth map from the multi-view images. Recently, one of the most commonly used methods for generating a high-quality depth map from multi-view images has been a PatchMatch method.

When depth values are estimated from multi-view images based on the similarity of color values between a single reference image and multiple neighboring images, it is important to efficiently reduce the number of candidates for accurate depth values. The PatchMatch method efficiently reduces a solution space, which is the collection of candidates for depth values, so it is successfully applied to the generation of a depth map from multi-view images.

However, like most other methods, methods based on PatchMatch are known to have low accuracy in estimation of depth values in a region in which it is difficult to estimate depth values due to the similarity of color values, as in a region in which there is a lack of texture information. Also, the low accuracy of depth values in such a region causes low consistency of depth values between images, so a dense point cloud is not able to be generated in the corresponding region.

One of the major causes of this problem is that the PatchMatch method has a limitation in that the solution space of each pixel reflects only depth values and normal values in a region close thereto, rather than reflecting depth values and normal values with respect to the entire structure of an image.

Methods of adding an image segmentation technique or the like have been provided in order to solve this problem, but in many cases, images are limitedly applicable in an actual environment compared to an experimental environment due to the characteristics of the segmentation technique. Also, there is a method of additionally using a pyramid structure for generating a depth map while gradually expanding the size of an image, but the range of a region to which the method is applicable is very limited.

DOCUMENTS OF RELATED ART (Patent Document 1) Korean Patent No. 10-1526866, registered on Jun. 2, 2015 and titled "Method and apparatus for depth noise filtering using depth information".

SUMMARY OF THE INVENTION

An object of the present invention is to generate a high-quality depth map by improving the accuracy of estimation of depth values.

Another object of the present invention is to generate a high-quality depth map by improving the accuracy of estimation of depth values even in regions in which there is a lack of texture and in which existing PatchMatch-based methods exhibit low accuracy in estimation of depth values when a depth map is generated from multi-view images.

A further object of the present invention is to generate a high-quality depth map by reflecting depth values and normal values with respect to the entire structure of an image.

In order to accomplish the above objects, a method for generating a depth map from multi-view images according to an embodiment of the present invention includes receiving multi-view images and parameters pertaining thereto; generating an initial depth map, an initial normal map, and an initial reliability map for the multi-view images; performing selection of multiple initial vertices and triangulation based on the initial depth map and the initial normal map and generating depth values and normal values for the result of the triangulation; performing regularization based on the triangulation, selecting additional vertices in the initial depth map, and generating additional depth values and additional normal values based on the regularization; and replacing depth values and normal values that have a reliability equal to or less than a preset level in the initial depth map and the initial normal map with the additional depth values and the additional normal values based on the regularization and the selected additional vertices, thereby refining the initial depth map into a refined depth map.

Here, generating the initial depth map, the initial normal map, and the initial reliability map may comprise generating the initial depth map, the initial normal map, and the initial reliability map using a PatchMatch method.

Here, generating the additional depth values and the additional normal values may comprise adding, as the additional vertex, the pixel having the highest rate of change in a color value in a block in which no initial vertices are selected.

Here, generating the additional depth values and the additional normal values may comprise calculating the mean value of the color values of pixels in a block in which no initial vertices are selected and adding the pixel having the color value that is most similar to the mean value as the additional vertex.

Here, generating the additional depth values and the additional normal values may include a first step in which the pixel having the highest rate of change in a color value in a block in which no initial vertices are selected is added as the additional vertex; and a second step in which the mean value of the color values of pixels in a block in which no vertices are selected before the second step is calculated and in which the pixel having the color value that is most similar to the mean value is added as the additional vertex.

Here, generating the depth values and the normal values for the result of the triangulation may comprise selecting initial vertices, performing triangulation based on the initial vertices, and calculating the normal vectors of patches generated through the triangulation, thereby generating the depth values and the normal values for the result of the triangulation.

Here, generating the additional depth values and the additional normal values may comprise performing the regularization using an equation based on vectorial total variation.

Here, the method may further include generating a final depth map by performing the PatchMatch method again based on the refined depth map.

Also, in order to accomplish the above objects, an apparatus for generating a depth map from multi-view images according to an embodiment of the present invention includes a reception unit for receiving multi-view images and parameters pertaining thereto; an initial map generation unit for generating an initial depth map, an initial normal map, and an initial reliability map for the multi-view images; a triangulation unit for performing selection of multiple initial vertices and triangulation based on the initial depth map and the initial normal map and generating depth values and normal values for the result of the triangulation; an additional value generation unit for performing regularization based on the triangulation, selecting additional vertices in the initial depth map, and generating additional depth values and additional normal values based on the regularization; and an initial map refinement unit for replacing depth values and normal values that have a reliability equal to or less than a preset level in the initial depth map and the initial normal map with the additional depth values and the additional normal values based on the regularization and the selected additional vertices, thereby refining the initial depth map into a refined depth map.

Here, the initial map generation unit may generate the initial depth map, the initial normal map, and the initial reliability map using a PatchMatch method.

Here, the additional value generation unit may add, as the additional vertex, the pixel having the highest rate of change in a color value in a block in which no initial vertices are selected.

Here, the additional value generation unit may calculate the mean value of the color values of pixels in a block in which no initial vertices are selected and add the pixel having the color value that is most similar to the mean value as the additional vertex.

Here, the additional value generation unit may add the additional vertices by performing a first step in which the pixel having the highest rate of change in a color value in a block in which no initial vertices are selected is added as the additional vertex and a second step in which the mean value of the color values of pixels in a block in which no vertices are selected before the second step is calculated and in which the pixel having the color value that is most similar to the mean value is added as the additional vertex.

Here, the triangulation unit may select initial vertices, perform triangulation based on the initial vertices, and calculate the normal vectors of patches generated through the triangulation, thereby generating the depth values and the normal values for the result of the triangulation.

Here, the additional value generation unit may perform the regularization using an equation based on vectorial total variation.

Here, the apparatus may further include a PatchMatch-reperforming unit for generating a final depth map by performing the PatchMatch method again based on the refined depth map.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

Figure 1:
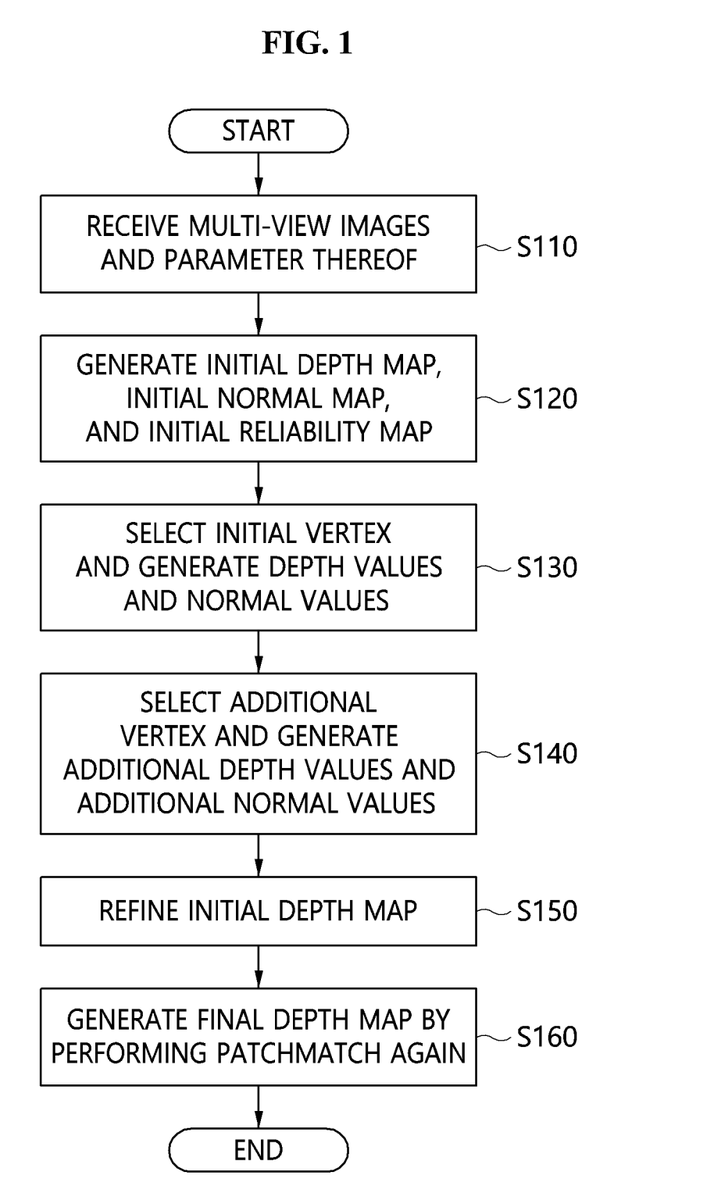
FIG. 1 is a flowchart for explaining a method for generating a depth map from multi-view images according to an embodiment of the present invention.

FIG. 1 is a flowchart for explaining a method for generating a depth map from multi-view images according to an embodiment of the present invention.

Referring to FIG. 1, in the method for generating a depth map from multi-view images according to an embodiment of the present invention, first, multi-view images and parameters pertaining thereto are received at step S110.

Figure 2:
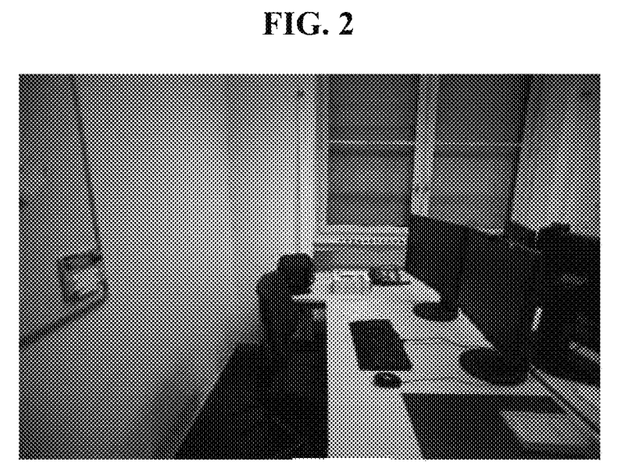
FIGS. 2 to 5 are exemplary views illustrating an original image of multi-view images and a depth map, a normal map, and a reliability map generated for the original image through a PatchMatch method.
Figure 3:
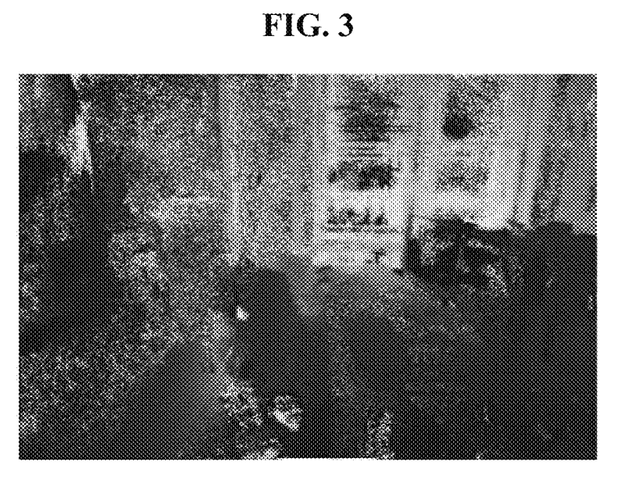
Figure 4:
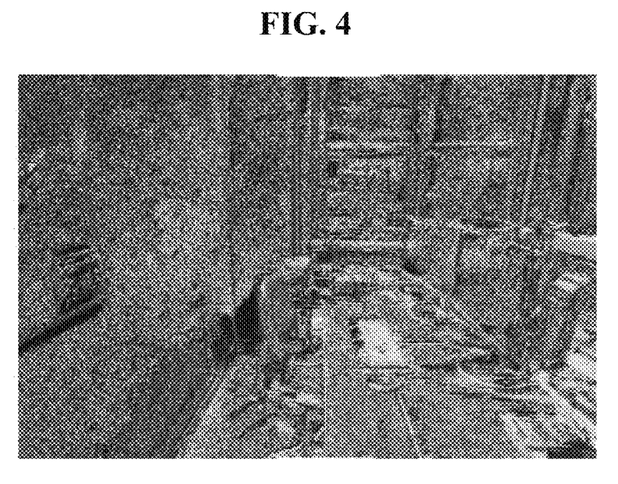
Figure 5:
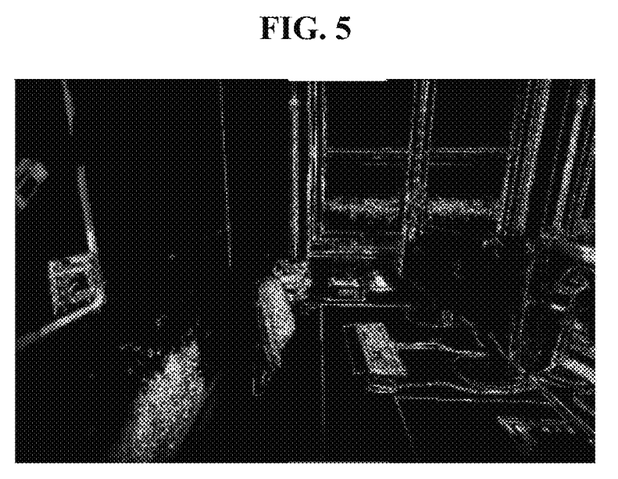

Subsequently, an initial depth map, an initial normal map, and an initial reliability map for the multi-view images are generated at step S120. Here, at step S120, the initial depth map, the initial normal map, and the initial reliability map may be generated using a PatchMatch method. FIGS. 2 to 5 are exemplary views illustrating an original image of multi-view images and a depth map, a normal map, and a reliability map generated for the original image using a Patch-Match method. Specifically, FIG. 2 is an example of the original image, and FIGS. 3, 4 and 5 are examples of the depth map, the normal map, and the reliability map generated from the original image using a PatchMatch method. The depth map and the normal map represent an image and the 3D spatial distance and the normal value of a scene or an object projected onto the location of each pixel in the image as the value of the pixel. The reliability map represents the degree of reliability of the depth value of each pixel in the depth map of each image. The reliability of a depth value may be measured using any of various methods. An example thereof is to calculate the color consistency with neighboring images in order to estimate a depth value in each pixel and determine the number of neighboring images in which the calculated value is equal to or greater than a certain level to be the reliability. The reliability map in FIG. 3 is an example in which the reliability is represented with a color value using this method.

Figure 6:
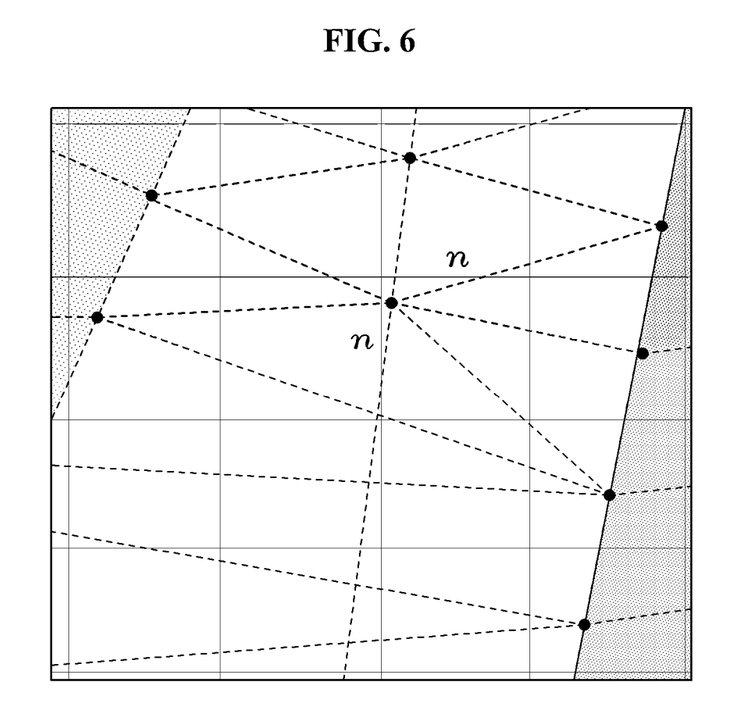
FIGS. 6 to 8 are views for explaining selection of initial vertices and selection and addition of additional vertices.

Then, selection of multiple initial vertices and triangulation are performed based on the initial depth map and the initial normal map, which are generated at step S120, and depth values and normal values for the result of triangulation are generated at step S130. That is, at step S130, initial vertices are selected, triangulation based on the initial vertices is performed, and the normal vectors of patches generated through triangulation, that is, the patch normals, are calculated, whereby depth values and normal values for the result of triangulation may be generated. FIG. 6 is a concept diagram illustrating the selection of initial vertices. In the present invention, an image is segmented into blocks having a size of n×n in order to select initial vertices. Then, the pixel determined to have the highest reliability in each block having a size of n×n is selected as an initial vertex. If the reliability of the pixel having the highest reliability in the block is less than a certain value, no initial vertex is selected therein. Then, triangulation is performed based on the initial vertices obtained in the entire image. As an example of triangulation applicable to the present invention, there is Delaunay triangulation. After triangulation, an initial patch normal value is calculated in each of the patches.

Figure 7:
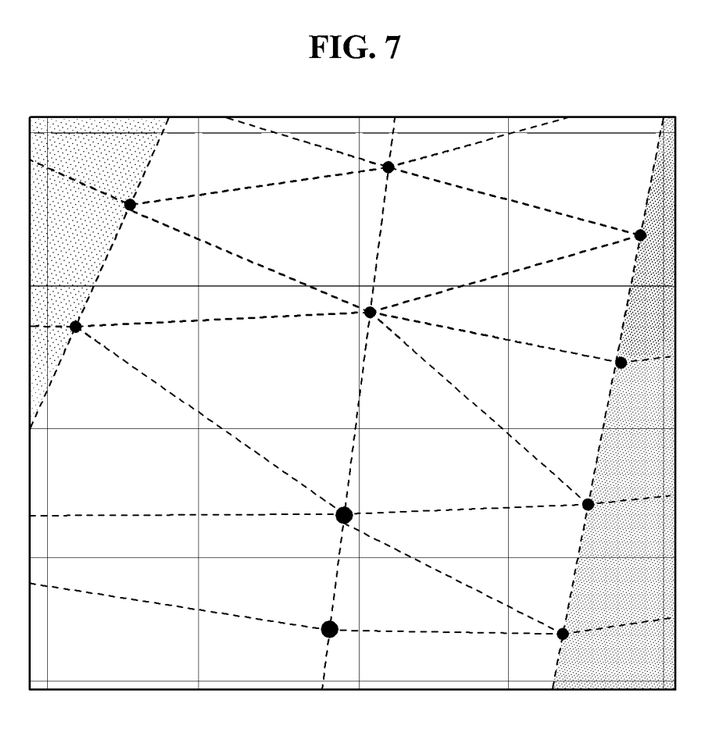
Figure 8:
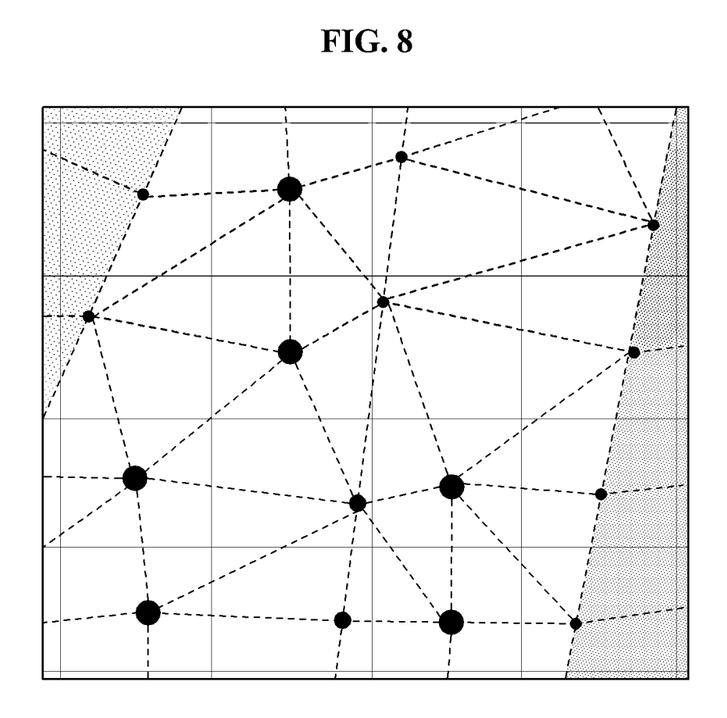

Subsequently, regularization is performed based on the triangulation performed at step S130, additional vertices are selected in the initial depth map, and additional depth values and additional normal values are generated based on the additional vertices and regularization at step S140. Here, at step S140, the pixel having the highest rate of change in the color value in the block in which no initial vertex is selected may be added as an additional vertex. Also, at step S140, the mean value of the color values of pixels in the block in which no initial vertex is selected is calculated, and the pixel having the color value that is most similar to the mean value may be added as an additional vertex. FIG. 7 and FIG. 8 are concept diagrams illustrating the process of selecting additional vertices in the image in which initial vertices were selected in FIG. 6.

Also, at step S140, after calculation of the initial patch normal and selection of additional vertices, regularization of the patch normal is performed. An equation for regularization may be obtained by applying equations based on vectorial total variation, as shown in Equations (1) to (3) below:

$$E(P) = \|PS\|_2 + \lambda TV(P) \quad (1)$$

$$\|PS\|_2 = \sqrt{\sum_{i=1}^{3}\sum_{\tau=1}^{T}(p_\tau)_i^2 s_\tau} \quad (2)$$

$$TV(P) = \sum_e w_e \sqrt{\sum_{i=1}^{3}|[p_i]_e|^2 l_e} \quad (3)$$

Here, T denotes the total number of patches, $\lambda$ denotes a Lagrange multiplier, and $p_\tau$ and $s_2$ are the patch normal and the area of the $\tau$-th patch. Also, $[p_i]_e$ is the absolute value of the difference of i-th components of the two patch normals neighboring each other with an edge e therebetween. Also, le is the length of the edge e. Also, We is a weight component for the edge e, and the weight component may be configured with color information and information about the difference from neighboring patch normals. For example, when two patches adjacent to each other are $t_i$ and $t_j$, weight components for the edge therebetween may be used, as shown in Equations (4) to (6) below.

$$w_e^{(i,j)} = w_p^{(i,j)} w_t^{(i,j)} \quad (4)$$

$$w_p^{(i,j)} = \exp(-\|p_i - p_j\|^4) \quad (5)$$

$$w_t^{(i,j)} = \exp(-\|mC(t_i) - mC(t_j)\|^2) \quad (6)$$

Here, $p_i$ and $mC(t_i)$ are a patch normal and a mean color value in patch $t_i$. The equation for regularization of the above patch normal may be optimized using various L1-norm-based optimization methods, such as an Augmented Lagrangian method.

Selection of additional vertices and generation of additional depth values and additional normal values is described in detail as follows. The addition of additional vertices may be performed through two steps. In the first step, the pixel having the highest rate of change in a color value in a block having a size of n×n, in which no initial vertex is selected, may be selected as an additional vertex in the corresponding block. FIG. 7 shows an example in which retriangulation is performed based on the initial vertices and the additional vertices added in the first step. In the second step, the mean of the color values of pixels in a block having a size of n×n, in which no vertex has been selected until the first step, is calculated, and the pixel having the color value that is most similar to the mean is selected as an additional vertex. FIG. 8 shows an example in which retriangulation is performed based on the additional vertices additionally selected in the second step and on the initial vertices and additional vertices selected before the second step.

The depth value of the additionally selected additional vertex may be calculated using the depth value of each vertex in the initial patch, in which the pixel selected as the additional vertex is included, and the regularized patch normal in the corresponding patch. For example, d of the plane equation shown in Equation (7) below is calculated using the three vertices $(v_x, v_y, v_z)_{i=1, 2, 3}$ and the regularized patch normal $(p_x, p_y, p_z)$ of a patch, and the distance from the plane equation is given as the initial value of the depth of the additional vertex.

$$p_x x + p_y y + p_z z = d \qquad (7)$$

After addition of the additional vertices and regularization of the patch normal, the depth values of the additional vertices are estimated. An example of estimation of the depth values is performed as follows. When the center of a camera pertaining to each image is $(c_x, c_y, c_z)$, when the unit vector passing through the location of the pixel corresponding to the i-th added additional vertex from the center of the camera is $n_i=((n_i)_x, (n_i)_y, (n_i)_z)$, when the location of a vertex connected through an edge is $(v_x, v_y, v_z)$, and when one of the two regularized patch normals adjacent to the edge is $(p_x, p_y, p_z)$, the relationship shown in Equation (8) below is satisfied.

$$p_x \cdot (\alpha_i(n_i)_x + c_x - v_x) + \qquad (8)$$
$$p_y \cdot (\alpha_i(n_i)_y + c_y - v_y) + p_z \cdot (\alpha_i(n_i)_z + c_z - v_z) = 0$$

If the vertex connected through the edge is the j-th added additional vertex, this may be represented as shown in Equation (9) below:

$$p_x \cdot (\alpha_i(n_i)_x + \alpha_j(n_j)_x) + \qquad (9)$$
$$p_y \cdot (\alpha_i(n_i)_y + \alpha_j(n_j)_y) + p_z \cdot (\alpha_i(n_i)_z + \alpha_j(n_j)_z) = 0$$

Here, the locations of the added vertices and depth values based thereon in an image are determined depending on α values. The α values of the added vertices may be calculated by changing the above two equations into matrices that take constants for the α values as the components thereof and applying a least-squares method or the like.

Also, the depth values and normal value having reliability equal to or less than a preset level in the initial depth map and the initial normal map are replaced with the additional depth values and the additional normal values generated in step S140, whereby the initial depth map is refined to a refined depth map at step S150. Here, the reliability of the depth values in each pixel may be checked using the reliability map shown in FIG. 3.

Also, estimation of depth values is again performed by again performing a PatchMatch method based on the refined depth map, whereby a final depth map is generated at step S160. Through the above-described processes, the method for generating a depth map from multi-view images according to an embodiment of the present invention refines a depth map by calculating more accurate normal values and depth values through regularization of patch normals and addition of vertices in a region in which reliable depth values cannot be calculated due to consistency of colors, such as a region in which there is a lack of texture, and again performs a PatchMatch method based on the refined depth map, thereby improving the accuracy of estimation of depth values in a region in which it is difficult to estimate depth values using the existing PatchMatch-based method, compared to when the conventional method is used, and generating a high-quality depth map based thereon.

Figure 9:
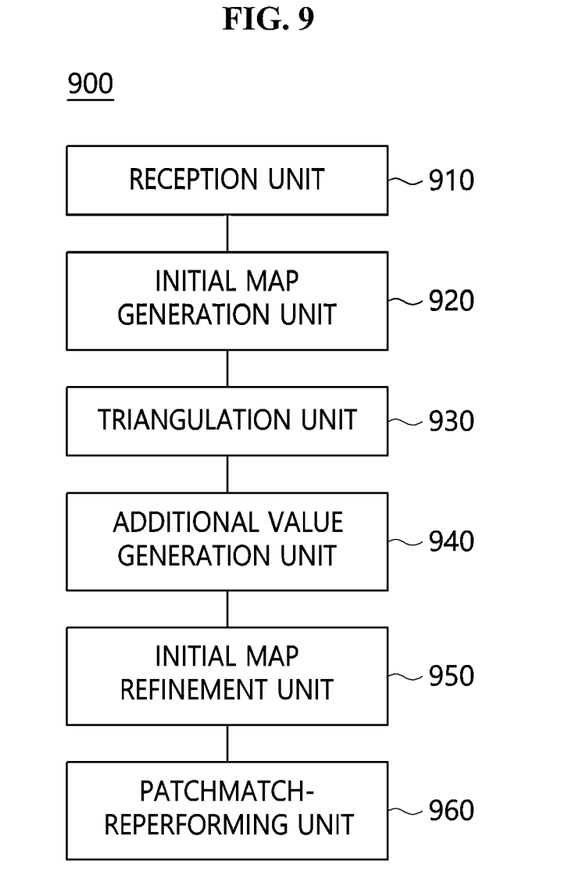
FIG. 9 is a block diagram for explaining an apparatus for generating a depth map from multi-view images according to an embodiment of the present invention.

FIG. 9 is a block diagram for explaining an apparatus for generating a depth map from multi-view images according to an embodiment of the present invention.

Referring to FIG. 9, the apparatus 900 for generating a depth map from multi-view images according to an embodiment of the present invention may be formed by including a reception unit 910, an initial map generation unit 920, a triangulation unit 930, an additional value generation unit 940, and an initial map refinement unit 950. Also, the apparatus 900 for generating a depth map from multi-view images according to an embodiment of the present invention may further include a PatchMatch-reperforming unit 960.

The reception unit 910 receives multi-view images and parameters pertaining thereto.

The initial map generation unit 920 generates an initial depth map, an initial normal map, and an initial reliability map for the multi-view images. Here, the initial map generation unit 920 may generate the initial depth map, the initial normal map, and the initial reliability map using a PatchMatch method.

The triangulation unit 930 performs selection of multiple initial vertices and triangulation based on the initial depth map and the initial normal map and generates depth values and normal values for the result of triangulation. Here, the triangulation unit 930 selects the initial vertices, performs triangulation based on the initial vertices, and calculates the normal vectors of patches generated through triangulation, thereby generating depth values and normal values for the result of triangulation.

The additional value generation unit 940 performs regularization based on triangulation, selects additional vertices in the initial depth map, and generates additional depth values and additional normal values based on regularization. The additional value generation unit 940 may add the pixel having the highest rate of change in the color value in a block, in which no initial vertex is selected, as an additional vertex. Also, the additional value generation unit 940 may calculate the mean value of the color values of pixels in a block in which no initial vertex is selected and add the pixel having the color value that is most similar to the mean value as an additional vertex. Also, the additional value generation unit 940 may add additional vertices through a first step in which the pixel having the highest rate of change in the color value in a block in which no initial vertex is selected is added as an additional vertex and a second step in which the mean value of the color values of pixels in a block in which no vertex has been selected until the first step is calculated and the pixel having the color value that is most similar to the mean value is added as an additional vertex. Also, the additional value generation unit 940 may perform regularization using an equation based on vectorial total variation.

The initial map refinement unit 950 refines the initial depth map to a refined depth map by replacing depth values and normal values that have reliability equal to or less than a preset level in the initial depth map and the initial normal map with the additional depth values and the additional normal values.

The PatchMatch-reperforming unit 960 generates a final depth map by again performing PatchMatch based on the refined depth map.

Figure 10:
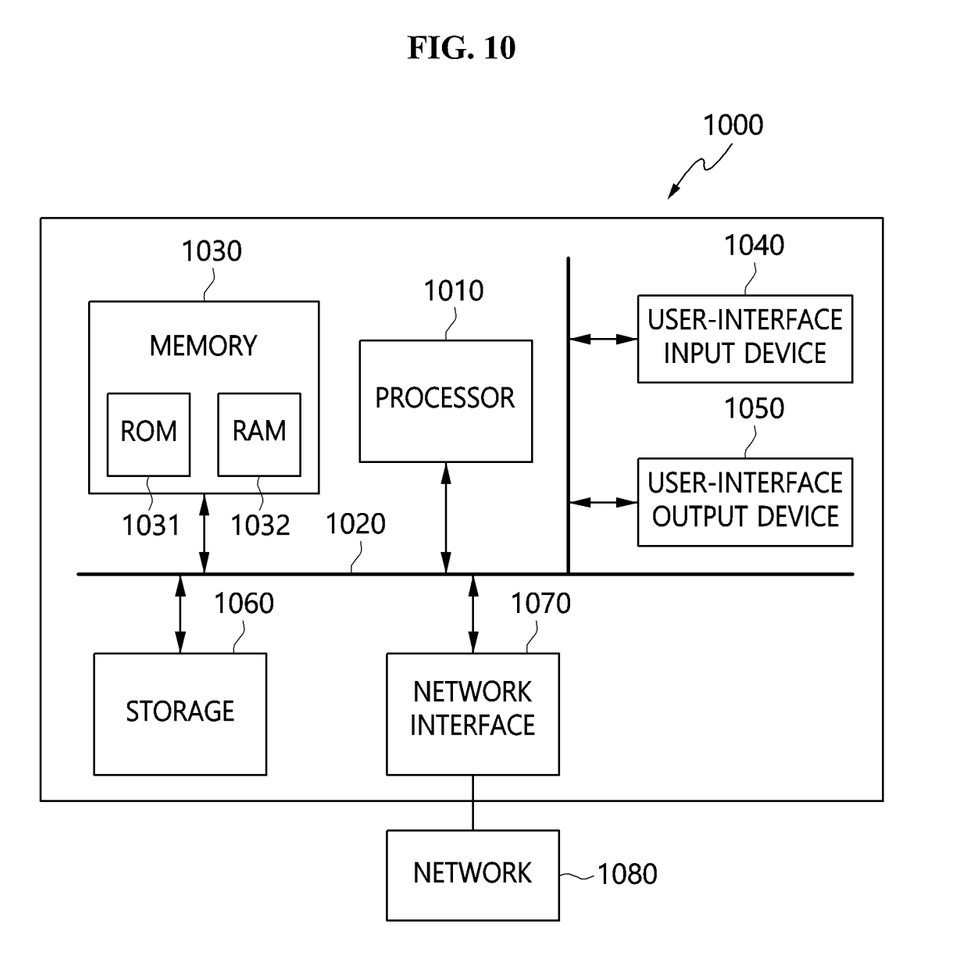
FIG. 10 is a view illustrating a computer system according to an embodiment of the present invention.

FIG. 10 is a view illustrating a computer system according to an embodiment of the present invention.

Referring to FIG. 10, an embodiment of the present invention may be implemented in a computer system including a computer-readable recording medium. As illustrated in FIG. 10, the computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing processing instructions stored in the memory 1030 or the storage 1060. The memory 1030 and the storage 1060 may be any of various types of volatile or nonvolatile storage media. For example, the memory may include ROM 1031 or RAM 1032.

Accordingly, an embodiment of the present invention may be implemented as a non-transitory computer-readable storage medium in which methods implemented using a computer or instructions executable in a computer are recorded. When the computer-readable instructions are executed by a processor, the computer-readable instructions may perform a method according to at least one aspect of the present invention.

According to the present invention, a high-quality depth map may be generated by improving the accuracy of estimation of depth values.

Also, the present invention enables a high-quality depth map to be generated by improving the accuracy of estimation of depth values even in regions in which there is a lack of texture and in which existing PatchMatch-based methods exhibit low accuracy in estimation of depth values when a depth map is generated from multi-view images.

Also, the present invention enables a high-quality depth map to be generated by reflecting depth values and normal values with respect to the entire structure of an image.

As described above, the apparatus and method for generating a depth map from multi-view images according to the present invention are not limitedly applied to the configurations and operations of the above-described embodiments, but all or some of the embodiments may be selectively combined and configured, so the embodiments may be modified in various ways.

What is claimed is:

1. A method for generating a depth map from multi-view images, comprising:
   receiving multi-view images and parameters pertaining thereto;
   generating an initial depth map, an initial normal map, and an initial reliability map for the multi-view images;
   performing selection of multiple initial vertices and triangulation based on the initial depth map and the initial normal map and generating depth values and normal values for a result of the triangulation;
   performing regularization based on the triangulation, selecting additional vertices in the initial depth map, and generating additional depth values and additional normal values based on the regularization; and
   replacing depth values and normal values that have a reliability equal to or less than a preset level in the initial depth map and the initial normal map with the additional depth values and the additional normal values based on the regularization and the selected additional vertices, thereby refining the initial depth map into a refined depth map.

2. The method of claim 1, wherein:
   generating the initial depth map, the initial normal map, and the initial reliability map comprises generating the initial depth map, the initial normal map, and the initial reliability map using a PatchMatch method.

3. The method of claim 2, wherein:
   generating the additional depth values and the additional normal values comprises adding, as the additional vertex, a pixel having a highest rate of change in a color value in a block in which no initial vertices are selected.

4. The method of claim 2, wherein:
   generating the additional depth values and the additional normal values comprises calculating a mean value of color values of pixels in a block in which no initial vertices are selected and adding a pixel having a color value that is most similar to the mean value as the additional vertex.

5. The method of claim 2, wherein:
   generating the additional depth values and the additional normal values includes
   performing a first operation in which a pixel having a highest rate of change in a color value in a block in which no initial vertices are selected is added as the additional vertex; and
   performing a second operation in which a mean value of color values of pixels in a block in which no vertices are selected before the second operation is calculated and in which a pixel having a color value that is most similar to the mean value is added as the additional vertex.

6. The method of claim 2, wherein:
   generating the depth values and the normal values for the result of the triangulation comprises selecting initial vertices, performing triangulation based on the initial vertices, and calculating normal vectors of patches generated through the triangulation, thereby generating the depth values and the normal values for the result of the triangulation.

7. The method of claim 2, further comprising:
   generating a final depth map by performing the PatchMatch method again based on the refined depth map.

8. The method of claim 1, wherein:
   generating the additional depth values and the additional normal values comprises performing the regularization using an equation based on vectorial total variation.

9. An apparatus for generating a depth map from multi-view images, comprising:
   a reception unit for receiving multi-view images and parameters pertaining thereto;
   an initial map generation unit for generating an initial depth map, an initial normal map, and an initial reliability map for the multi-view images;
   a triangulation unit for performing selection of multiple initial vertices and triangulation based on the initial depth map and the initial normal map and generating depth values and normal values for a result of the triangulation;
   an additional value generation unit for performing regularization based on the triangulation, selecting additional vertices in the initial depth map, and generating additional depth values and additional normal values based on the regularization; and
   an initial map refinement unit for replacing depth values and normal values that have a reliability equal to or less than a preset level in the initial depth map and the initial normal map with the additional depth values and the additional normal values based on the regularization and the selected additional vertices, thereby refining the initial depth map into a refined depth map.

10. The apparatus of claim 9, wherein:
    the initial map generation unit generates the initial depth map, the initial normal map, and the initial reliability map using a PatchMatch method.

11. The apparatus of claim 10, wherein:
the additional value generation unit adds, as the additional vertex, a pixel having a highest rate of change in a color value in a block in which no initial vertices are selected.

12. The apparatus of claim 10, wherein:
the additional value generation unit calculates a mean value of color values of pixels in a block in which no initial vertices are selected and adds a pixel having a color value that is most similar to the mean value as the additional vertex.

13. The apparatus of claim 10, wherein:
the additional value generation unit adds the additional vertices by performing a first operation in which a pixel having a highest rate of change in a color value in a block in which no initial vertices are selected is added as the additional vertex and a second operation in which a mean value of color values of pixels in a block in which no vertices are selected before the second operation is calculated and in which a pixel having a color value that is most similar to the mean value is added as the additional vertex.

14. The apparatus of claim 10, wherein:
the triangulation unit selects initial vertices, performs triangulation based on the initial vertices, and calculates normal vectors of patches generated through the triangulation, thereby generating the depth values and the normal values for the result of the triangulation.

15. The apparatus of claim 10, further comprising:
a PatchMatch-reperforming unit for generating a final depth map by performing the PatchMatch method again based on the refined depth map.

16. The apparatus of claim 9, wherein:
the additional value generation unit performs the regularization using an equation based on vectorial total variation.

* * * * *